(12) United States Patent
Stucko

(10) Patent No.: US 9,981,515 B2
(45) Date of Patent: May 29, 2018

(54) TRAILER ALIGNMENT APPARATUS

(71) Applicant: Metro Stucko, Bayport, NY (US)

(72) Inventor: Metro Stucko, Bayport, NY (US)

( * ) Notice: Subject to any disclaimer, the term of this patent is extended or adjusted under 35 U.S.C. 154(b) by 0 days. days.

(21) Appl. No.: 15/613,831

(22) Filed: Jun. 5, 2017

(65) Prior Publication Data

US 2017/0349015 A1    Dec. 7, 2017

Related U.S. Application Data

(60) Provisional application No. 62/345,100, filed on Jun. 3, 2016.

(51) Int. Cl.
  *B60D 1/40*  (2006.01)
  *B60D 1/30*  (2006.01)
  *B60D 1/06*  (2006.01)

(52) U.S. Cl.
  CPC .............. *B60D 1/40* (2013.01); *B60D 1/065* (2013.01); *B60D 1/30* (2013.01)

(58) Field of Classification Search
  CPC ............. B60D 1/40; B60D 1/36; B60D 1/363
  See application file for complete search history.

(56) References Cited

U.S. PATENT DOCUMENTS

| | | | | | |
|---|---|---|---|---|---|
| 3,126,210 | A | * | 3/1964 | Hill | B60D 1/40 280/479.2 |
| 3,860,267 | A | * | 1/1975 | Lyons | B60D 1/40 280/479.3 |
| 4,178,011 | A | * | 12/1979 | Kirsch | B60D 1/38 280/477 |
| 4,254,969 | A | * | 3/1981 | Martin | B60D 1/40 280/477 |
| 4,558,883 | A | * | 12/1985 | Bouma | B60D 1/40 280/479.3 |
| 4,611,821 | A | * | 9/1986 | Jeanson | B60D 1/155 280/432 |
| 4,714,265 | A | * | 12/1987 | Franklin | B60D 1/40 280/482 |
| 4,903,978 | A | * | 2/1990 | Schrum, III | B60D 1/363 280/477 |
| 4,951,957 | A | * | 8/1990 | Gullickson | B60D 1/40 280/479.2 |
| 5,236,215 | A | * | 8/1993 | Wylie | B60D 1/363 280/477 |
| 5,277,447 | A | * | 1/1994 | Blaser | B60D 1/40 280/478.1 |
| 5,624,129 | A | * | 4/1997 | Clark, Jr. | B60D 1/155 280/478.1 |
| 5,671,937 | A | * | 9/1997 | Haberle | B60D 1/155 280/407 |
| 5,845,921 | A | * | 12/1998 | Stimac | B60D 1/155 280/479.3 |

(Continued)

FOREIGN PATENT DOCUMENTS

WO    8800149    1/1988

*Primary Examiner* — Kevin Hurley
*Assistant Examiner* — Michael R Stabley
(74) *Attorney, Agent, or Firm* — Gearhart Law LLC

(57) ABSTRACT

The present disclosure relates to a trailer alignment device intended to facilitate the backing up of an automobile to align a hitch of the automobile with a towable trailer. The alignment device further provides for trailer stabilization by providing for a second point of attachment for the trailer to the automobile.

13 Claims, 6 Drawing Sheets

(56) References Cited

U.S. PATENT DOCUMENTS

| | | | | |
|---|---|---|---|---|
| 5,975,552 | A * | 11/1999 | Slaton | B60D 1/38 |
| | | | | 280/478.1 |
| 6,419,257 | B1 | 7/2002 | McCoy et al. | |
| 6,811,175 | B1 * | 11/2004 | Keyser | B60D 1/06 |
| | | | | 280/477 |
| 6,969,085 | B2 * | 11/2005 | Causey, Jr. | B60D 1/065 |
| | | | | 280/432 |
| 7,004,548 | B1 * | 2/2006 | Oberg | B60D 1/155 |
| | | | | 298/17 S |
| 7,185,907 | B1 * | 3/2007 | Young | B60D 1/155 |
| | | | | 280/414.1 |
| 7,364,180 | B2 * | 4/2008 | Hensley | B60D 1/00 |
| | | | | 280/455.1 |
| 7,461,855 | B2 * | 12/2008 | Klar | B60D 1/155 |
| | | | | 280/478.1 |
| 7,677,588 | B2 * | 3/2010 | Coers | B60D 1/155 |
| | | | | 280/475 |
| 7,963,544 | B2 * | 6/2011 | Harlin | B60D 1/00 |
| | | | | 280/477 |
| 8,335,607 | B2 * | 12/2012 | Gatten | B60D 1/01 |
| | | | | 180/14.2 |
| 2003/0057675 | A1 | 3/2003 | Grantland | |
| 2004/0075242 | A1 | 4/2004 | Richards | |
| 2008/0122198 | A1 | 5/2008 | Anderson | |
| 2008/0143078 | A1 | 6/2008 | McCoy et al. | |
| 2010/0213687 | A1 * | 8/2010 | McDaniel | B60D 1/06 |
| | | | | 280/491.2 |

\* cited by examiner

TRAILER ALIGNMENT APPARATUS

CLAIM OF PRIORITY

This application claims priority to U.S. Application 62/345,100 filed on Jun. 3, 2016, the contents of which are hereby fully incorporated by reference in its entirety.

FIELD OF THE EMBODIMENTS

The field of the embodiments of the present invention relate to trailer alignment devices intended to facilitate the backing up of an automobile to a trailer. Further, the invention relates to devices for trailer stabilization by providing for a second point of attachment for the trailer to the automobile.

BACKGROUND OF THE EMBODIMENTS

Various different types of trailer hitches are known in the art for attaching trailers to towing vehicles. One of the most common types of towing systems utilizes a ball hitch. Typical ball hitches have a generally spherical shaped structure with a stem or threaded rod extending from a base. The threaded rod may be configured to engage a hitch head mounted on the towing vehicle using a threaded receiver or ball hitch fitting. A trailer coupling member, positioned on a front of the trailer tongue, may engage the ball hitch in a loose friction fit, and may be secured to the spherical structure or ball in preparation for towing.

One of the biggest safety concerns with towing trailers is that the trailers may sway, leading to loss of control of the towing vehicle. A number of factors may contribute to sway, including: side winds, passing vehicles, quick lane changes, uneven roads and sudden stops. Some trailer hitches may not handle these situations well and may often exacerbate the sway problem making driving even more stressful and difficult.

Further, a person typically has to go through a process of trial and error in order to back up a vehicle and couple the vehicle to a trailer. Such a process is tedious and time consuming and often requires an individual outside the vehicle providing directions.

Some hitches include load equalizing systems utilizing spring arms or bars to distribute loads and allow the towing vehicle and trailer to remain level. One end of the spring arms may be attached under the ball hitch and hitch head. The spring arms may extend from the hitch head towards the trailer, and may be joined to the trailer tongue using chains and/or brackets. The end of the spring arms opposite the hitch head may be lifted or loaded to place an upward force on the hitch head to thereby equalize the load exerted on the trailer hitch. Various mechanisms are known for use in association with a trailer hitch to reduce side sway of the trailer as well as to equalize loads.

Some prior attempts at solving the aforementioned issues include brackets for joining the spring bars to the trailer tongue to form as rigid members, whereas other embodiments of the brackets may be a flexible member, such as a chain. A drawback of the known solutions is that the flexible members or chains may not provide stabilizing support to the spring bars and may allow the spring bars to swing back and forth like a pendulum.

Thus, there is a need for a technology that not only assists a user in quickly and efficiently aligning a trailer hitch of an automobile with a trailer coupling mechanism, but also a mechanism that will prevent or limit swaying of the trailer. The present invention and its embodiments meets and exceeds these objectives.

Review of Related Technology:

U.S. Pat. No. 6,419,257 pertains to a weight distributing hitch assembly for towing a trailer behind a towing vehicle includes a ball mount head, a pair of spring bars, a pair of adjustable length cam arms for supporting projecting ends of the spring bars, a pair of lift units carried on the trailer and a pair of lift chains extending between the cam arms and the lift units. The projecting ends of the spring bars include a cam follower and the distal ends of the cam arms include cooperating cams that function to provide trailer sway control.

U.S. Patent Application 2008/0122198 pertains to a trailer hitch system for equalizing trailer loads and reducing trailer sway. The trailer hitch system may include spring bars that may be attached to a hitch head using a trunnion style connection. The spring bars may be attached to the trailer using rigid brackets that reduce swinging of the spring bars. The rigid brackets may include an upward extending portion for attaching to the trailer tongue, and a lateral extending portion for receiving the spring bars thereupon. The brackets may have a contact surface on the lateral extending portion that may be free from a coating such that a metal on metal contact is made between the spring bars and the brackets. Portions of the brackets beyond the contact surface may be covered with a protective coating.

U.S. Patent Application 2003/0057675 pertains to an apparatus for aligning a vehicle with a trailer. The device includes a first member which is fixed to the vehicle and which extends outward from the back of the vehicle and a second member which is fixed to the trailer and extends upward from the trailer. The first member and the second member can be aligned and the aligning of the first and second members also aligns a first coupling device of the vehicle and a second coupling device of the trailer. The first and second coupling devices when aligned can be coupled together to couple the vehicle to the trailer. The second member may extend upward beyond the bottom of a rear windshield of the vehicle, when the first and second coupling devices are coupled together. The second member may include a pole portion which extends upward substantially perpendicularly to a horizontal beam member of the trailer. The first member may be a forked member which may include first and second prongs. The pole portion can fit within a region substantially encompassed by the first and second prongs.

Various devices are known in the art. However, their structure and means of operation are substantially different from the present disclosure. The other inventions fail to solve all the problems taught by the present disclosure. At least one embodiment of this invention is presented in the drawings below and will be described in more detail herein.

SUMMARY OF THE EMBODIMENTS

Generally, the present invention and its embodiments provide for a trailer alignment device configured to be coupled to both an automobile and a trailer or towable trailer or transport trailer. The alignment device or mechanism is further adapted to provide stabilization to the trailer.

In practice, a user can couple the trailer alignment device to a rear portion of an automobile, preferably to a left rear portion. This left sided arrangement allows the driver to visualize the alignment device from the driver's seat of the vehicle. The driver can then back up the automobile aligning the trailer alignment device with the corresponding coupling mechanism present on the transport trailer. Once the two are aligned, the transport trailer and hitch ball are aligned by default. The user can then couple both to one another and drive away. This not only removes the need for guess work as to the position of the transport trailer relative to the trailer hitch but further serves to stabilize the transport trailer during transport.

In one embodiment of the present invention there is a trailer stabilization system having a first coupling mechanism coupled to a first structure; a second coupling mechanism coupled to a second structure; an alignment mechanism coupled to each of the first coupling mechanism and the second coupling mechanism, the alignment mechanism having a first section and a second section with the first section being slidably engaged to the first section; and at least one securement mechanism for securing a position of the alignment mechanism.

In another embodiment of the present invention there is a trailer stabilization system having a first coupling mechanism coupled to an automobile, wherein the first coupling mechanism has a first plate and a second plate with each plate having an aperture therethrough; a second coupling mechanism coupled to a trailer, wherein the second coupling mechanism has a first plate and a second plate with each plate having an aperture therethrough; an alignment mechanism having a first end and a second end with each of the first end and the second end having a coupling extension with an aperture therethrough, the alignment mechanism being coupled to each of the first coupling mechanism and the second coupling mechanism, wherein the alignment mechanism has a first section and a second section with the first section being slidably engaged to the first section, wherein the first section and second section have a plurality of apertures through at least one side surface of the alignment mechanism; wherein a first pin and a second pin secure the alignment mechanism and the first coupling mechanism and second coupling mechanism respectively; and wherein a third pin fixes a working length of the alignment mechanism.

In another aspect of the present invention there is a method of aligning a towable trailer and an automobile, the method comprising the steps of: engaging a first end of an alignment mechanism with a first coupling mechanism, the first coupling mechanism being secured to a portion of an automobile; securing the first end of the alignment mechanism to the first coupling mechanism; operating the automobile such that a second end of the alignment mechanism engages with a second coupling mechanism, the second coupling mechanism being coupled to the towable trailer; securing the second end of the alignment mechanism to the second coupling mechanism; and securing a trailer hitch of the automobile to a trailer coupling mechanism of the towable trailer.

In general, the present invention succeeds in conferring the following, and others not mentioned, benefits and objectives.

It is an object of the present invention to provide a trailer alignment system that enables a user to easily align a trailer hitch to a towable trailer.

It is an object of the present invention to provide a trailer alignment system limits or prevents swaying of a towed trailer.

It is an object of the present invention to provide a trailer alignment system that is functional with a variety of trailers and automobiles.

It is an object of the present invention to provide a trailer alignment system that provides a visual cue to a driver of the automobile as to where to back the automobile to the trailer.

It is an object of the present invention to provide a trailer alignment system that enables one person to back an automobile to a trailer.

It is an object of the present invention to provide a trailer alignment system that is readily detachable when not in use.

It is an object of the present invention to provide a trailer alignment system that is secure and safe.

DESCRIPTION OF THE PREFERRED EMBODIMENTS

Figure 1:
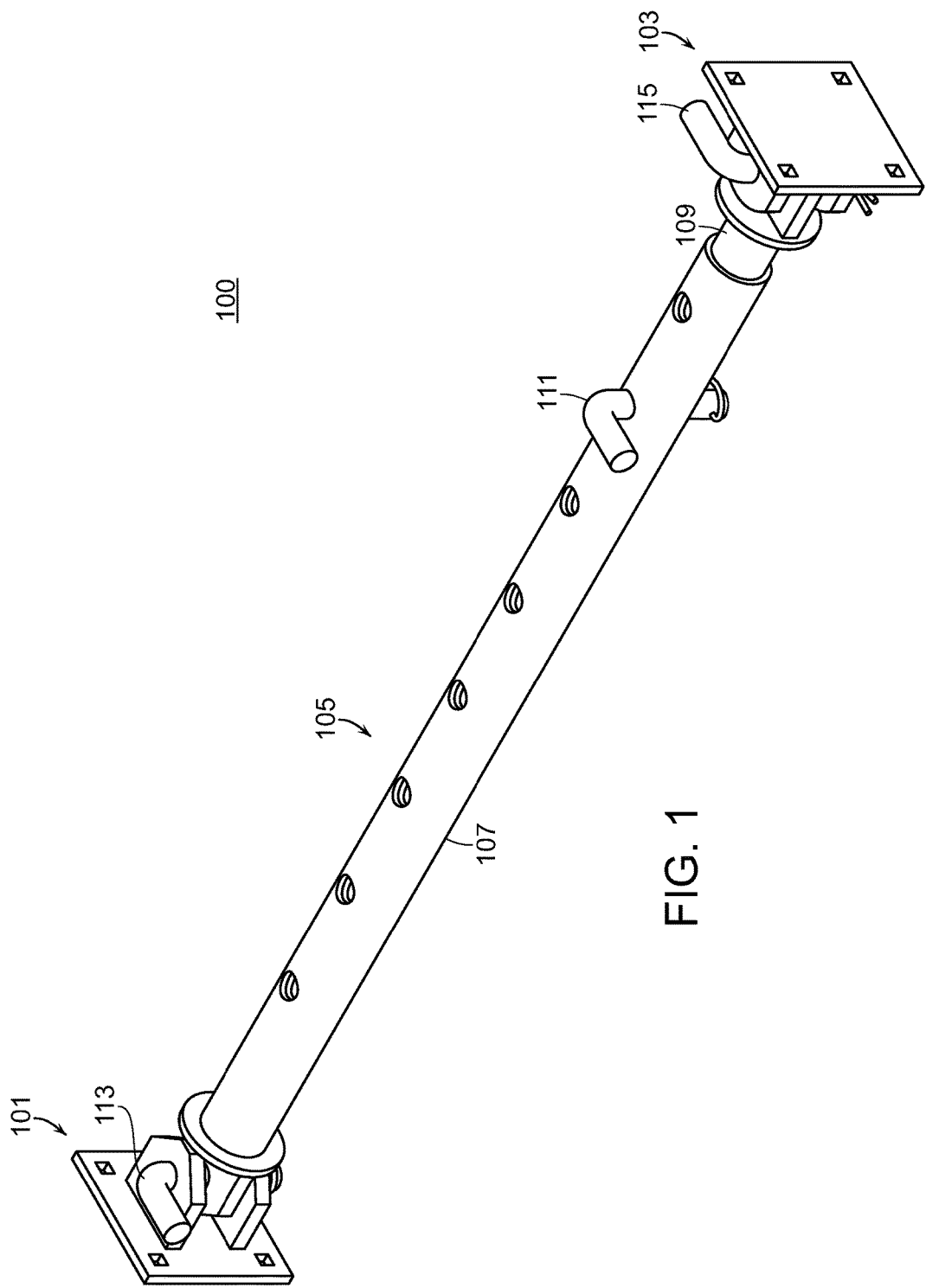
FIG. 1 is a perspective view of an embodiment the present invention.

The preferred embodiments of the present invention will now be described with reference to the drawings. Identical elements in the various figures are identified with the same reference numerals.

Reference will now be made in detail to each embodiment of the present invention. Such embodiments are provided by way of explanation of the present invention, which is not intended to be limited thereto. In fact, those of ordinary skill in the art may appreciate upon reading the present specification and viewing the present drawings that various modifications and variations can be made thereto.

Referring now to FIGS. 1-4, there are varying views of an embodiment of the present invention. Generally, there is a trailer alignment system 100 having a first coupling mechanism 101, second coupling mechanism 103, an alignment mechanism 105, a first section 107, a second section 109, a securement mechanism 111, a first coupling securement mechanism 113, a second coupling securement mechanism 115, a first plate 117, a second plate 119, a plate aperture 121, a coupling extension 123, a coupling extension aperture 125, first and second section apertures 127, and a third securement mechanism 117.

In FIG. 1, there is a perspective view of the trailer alignment system 100 with the individual components coupled to one another. Note, that it is intended that the trailer alignment mechanism is coupled to both an automobile or vehicle and a transport trailer (see FIGS. 6-7). The first coupling mechanism 101 is intended to be coupled to a portion of a vehicle or a vehicle frame and the second coupling mechanism 103 is intended to be coupled to a transport trailer or transport trailer frame. However, each mechanism is capable of being coupled to each of the respective bodies.

The alignment mechanism 105 is coupled to each of the first coupling mechanism 101 and the second coupling mechanism 103 by a first coupling mechanism 113 and a second coupling mechanism 115 respectively. A third coupling mechanism 111 is configured to couple with the alignment mechanism 105. Each of the first, second, and third coupling mechanisms may further be secured, once inserted into the appropriate aperture, with a pin or other appropriate mechanism.

The alignment mechanism 105 may further comprise a first section 107 and a second section 109 with the first section 107 being slidably engaged to the second section 109. In some embodiments the first section 107 has a diameter that is larger than that of the second section 109 and in some embodiments this spatial relationship is reversed. In other embodiments, other relationships are formed between the sections including hydraulic implementations and the like.

Figure 2:
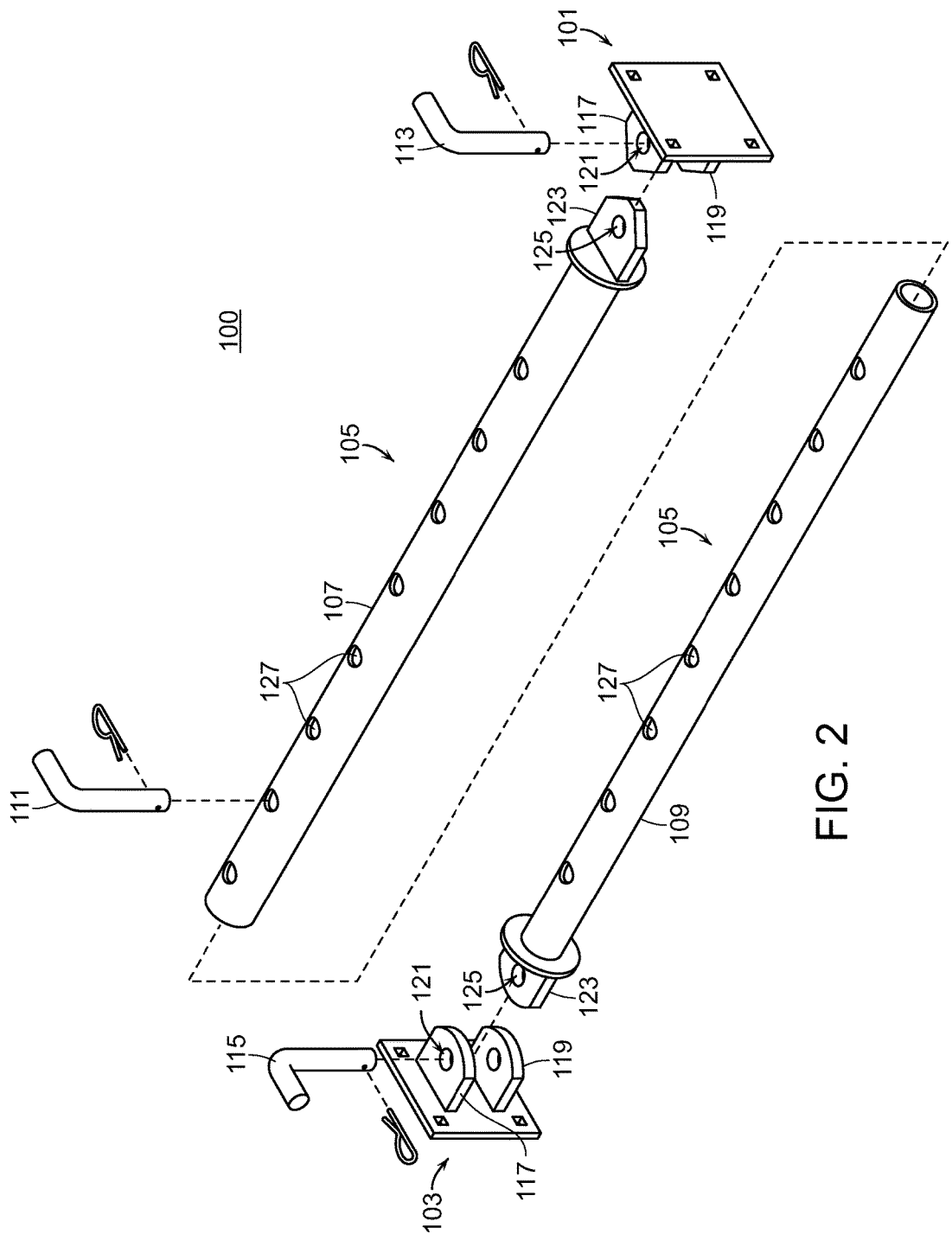
FIG. 2 is an exploded view of an embodiment of the present invention.

In FIG. 2, there is an exploded view of the components of an embodiment of the present invention. Here, there is a clear visualization as to the components of the embodiment as well as their relationship to one another.

As shown, the first coupling mechanism 101 and the second coupling mechanism 103 further comprise a first plate 117 and a second plate 119. Each of the first plate 117 and the second plate 119 have apertures 121 through each. The plates are generally perpendicular to the main body portion of the respective coupling apparatus with a distance therebetween. The apertures provide for the securement mechanisms to be placed therethrough thereby coupling the coupling mechanisms to the alignment mechanism 105.

The alignment mechanism 105 further has a coupling extension 123 with a coupling extension aperture 125 on each of a first end and a second end of the alignment apparatus 105. The coupling extensions 123 are generally perpendicular to the alignment mechanism main body. The coupling extensions 123 are generally sized to fit between the distance formed by the first plate 117 and the second plate 121 on each of the first coupling mechanism 101 and the second coupling mechanism 103.

Figure 3:
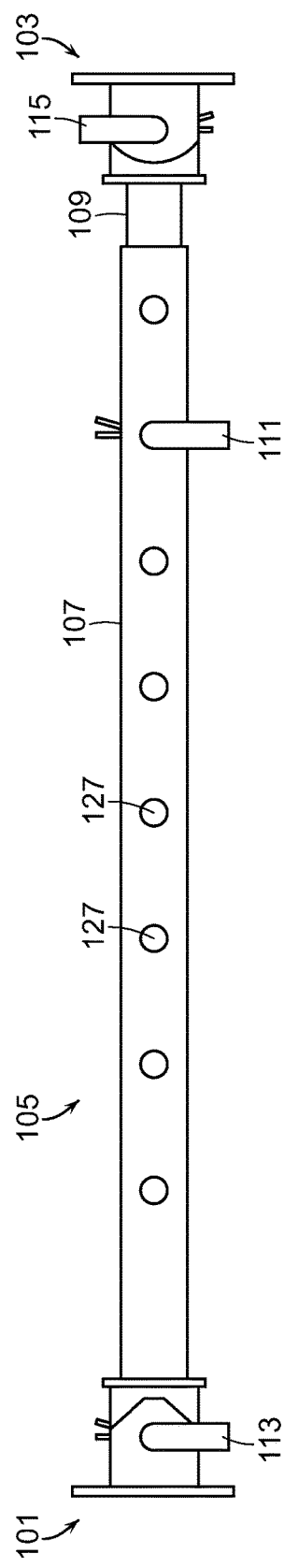
FIG. 3 is a top view of an embodiment of the present invention.
Figure 4:
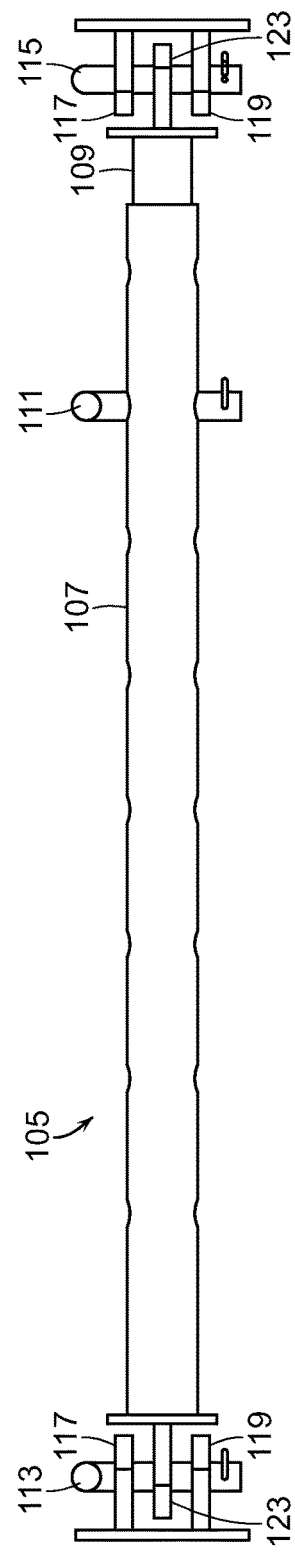
FIG. 4 is a side view of an embodiment of the present invention.

FIGS. 3-4 illustrate a top view and a side view respectively of an embodiment of the present invention. Such views further demonstrate the described relationship between components of the present invention when assembled as intended in at least one embodiment.

Figure 5:
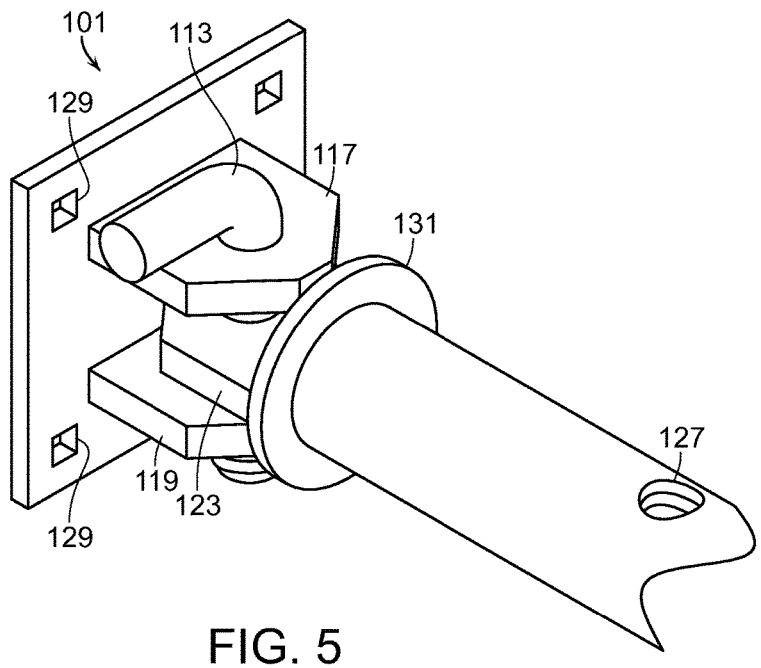
FIG. 5 is an enlarged view of a coupling mechanism.
Figure 6:
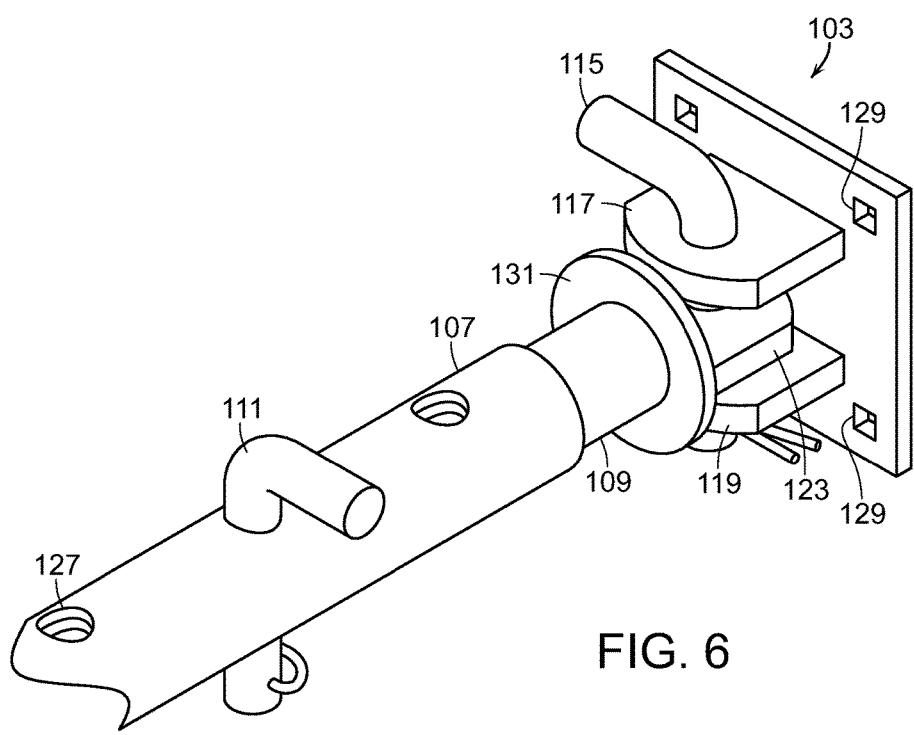
FIG. 6 is an enlarged view of a second coupling mechanism including the structure of the alignment mechanism.

FIGS. 5-6 illustrate close up assemblies of each of the first coupling mechanism 101 and the second coupling mechanism 103. Each of the coupling mechanisms is shown having a first plate 117, second plate 119, and plate apertures 129. A first securement mechanism 113 and a second securement mechanism 115 are shown therethrough. The plate apertures 129 are configured to allow bolts, anchors, screws, nails, and the like or some combination thereof to be positioned therethrough. Such mechanisms are utilized to couple the coupling mechanisms to the automobile or transport trailer respectively.

Further, the alignment mechanism 105 is shown having a blocking mechanism 131 in proximity to each of a first end and a second end of the alignment mechanism 105. The blocking mechanism 131 prevents over insertion of the coupling extension 125 into the distance formed by the first plate 117 and the second plate 119. Additionally, the blocking mechanism 131 serves to assist a user in aligning the aperture of the coupling extension 125 with that of the first plate 117 and the second plate 119.

Figure 7:
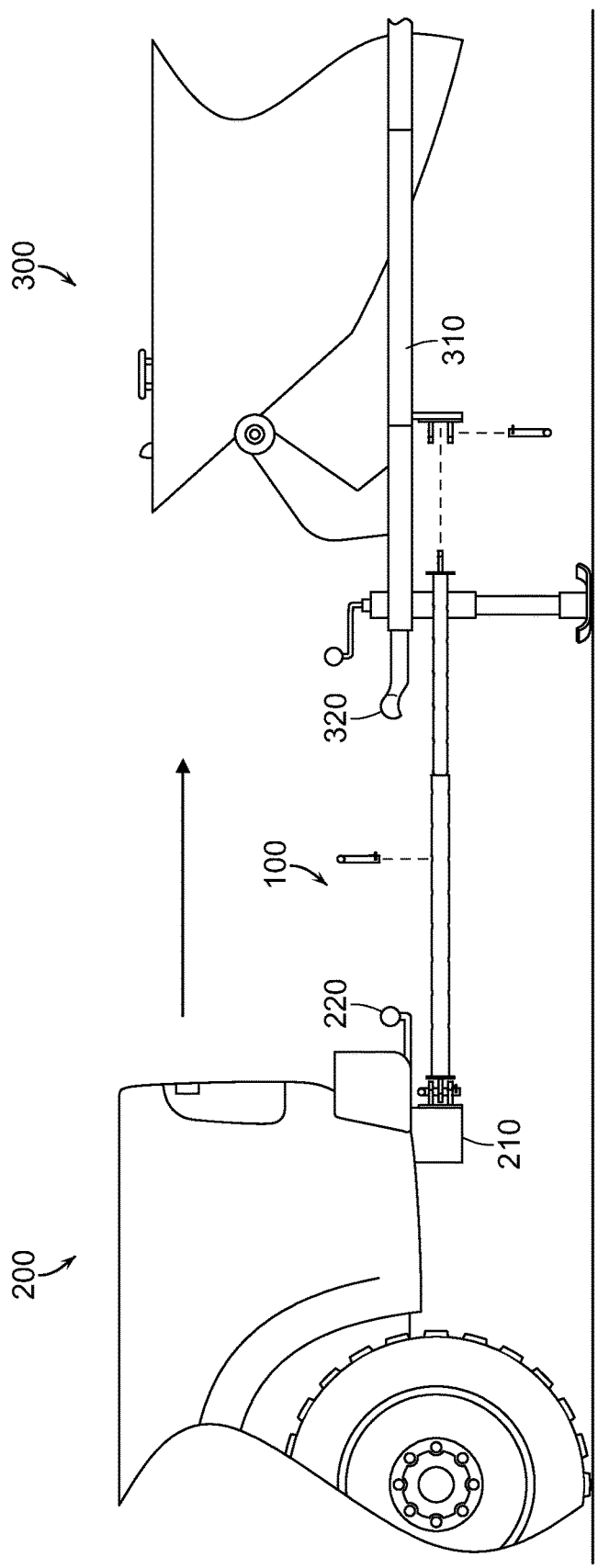
FIG. 7 is a side view demonstrating an exemplary detached position of an automobile and a trailer used in conjunction with an embodiment of the present invention.
Figure 8:
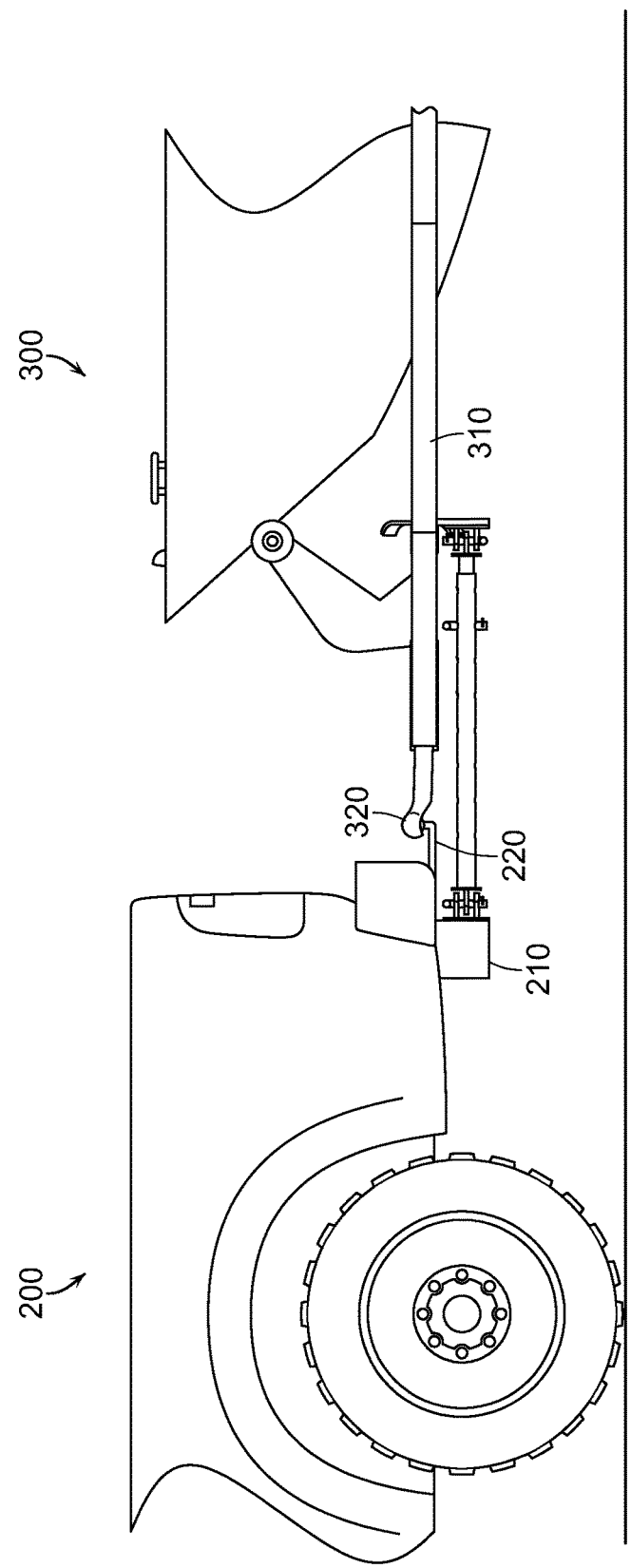
FIG. 8 is a side view demonstrating an exemplary attached position of an automobile and a trailer used on conjunction with an embodiment of the present invention.

FIGS. 7-8 illustrate one intended usage of an embodiment of the present invention. shown in the figures is a vehicle 200, a boat 300, a vehicle coupling point 210, a trailer coupling point 310, a trailer hitch 320, and a hitch ball 220. The specific type of vehicle performing the towing or the vehicle or apparatus being towed may vary from what is shown and may include virtually any vehicle capable of towing and any transport trailer (bearing any number of items) capable of being towed.

In at least one intended usage, the trailer alignment system 100 is coupled to the vehicle coupling point 210. The trailer alignment apparatus 100 is preferably coupled to the left rear portion of the vehicle. This allows the driver to visualize the trailer alignment system 100 from the driver's seat of the vehicle 200.

As the driver backs up the vehicle 200 towards the transport trailer the driver guides the coupling extension of the alignment apparatus into the distance formed by the first plate and the second plate of the second coupling mechanism. Once in place, the second coupling mechanism may be secured with a second securement mechanism. Further, as shown in FIG. 8, the trailer hitch 320 and the trailer ball 220 will be aligned by default once the alignment mechanism is properly positioned within the bounds of the second coupling mechanism. The drive can then drive away with the trailer properly coupled to the vehicle 200.

In some embodiments, the driver or user may first need to adjust a length of the alignment mechanism before attempting to back up the vehicle 200. In other embodiments, a driver may make such necessary adjustments after coupling the alignment mechanism to the second coupling mechanism. The alignment mechanism should be secured with a third securement mechanism to prevent movement in the length of the alignment mechanism during transport.

Such an embodiment of the present invention takes the guess work out of trying to align the trailer hitch 320 and the hitch ball 220. Further, the system provides stability to the towing system as a whole. This extra "support arm" creates a second point of contact between the vehicle 200 and the transport trailer. This can prevent or reduce the amount of sway experienced by the driver of the vehicle 200 thereby providing for a safer journey for towing.

The present invention as described in FIGS. 1-8 may comprise any number and type of materials including but not limited plastics, resins, composites, and potentially some lightweight metals. Plastics may include but are not limited to polyethylene terephthalate (PET), polyethylene (PE), high-density polyethylene, polyvinyl chloride (PVC), polyvinylidene chloride (PVDC), low-density polyethylene (LDPE), polypropylene (PP), polystyrene (PS), high impact polystyrene (HIPS) and polycarbonate (PC), or any combination thereof.

Composites may include but are not limited to fiber reinforced plastics, metal composites, carbon fiber, and Kevlar® and the like. Metals may comprise lightweight metals such as aluminum and other pure metals as well as various alloys. Additionally, the present invention may comprise a combination of classes of materials such as a plastic and a textile covering such as woven or unwoven fabric, cloth, terrycloth, woven or non-woven fibers of wool, flax, cotton, and synthetic textiles including but not limited to nylon, polyester, and/or acrylic, or any combinations thereof. Preferably, the present invention and its embodiments are selected for their lightweight and durable properties.

It is intended that the apparatus be sized such that the working distance formed by the system as a whole enables the alignment apparatus to be secured and have a length of about four feet to about twenty-five feet and is more preferably about six feet to about eight feet.

Although this invention has been described with a certain degree of particularity, it is to be understood that the present disclosure has been made only by way of illustration and that numerous changes in the details of construction and arrangement of parts may be resorted to without departing from the spirit and the scope of the invention.

What is claimed is:

1. A trailer alignment system comprising:
   a first coupling mechanism coupled to an automobile,
      wherein the first coupling mechanism has a first plate and a second plate with each of the first plate and the second plate having at least one aperture therethrough;
   a second coupling mechanism coupled to a trailer,
      wherein the second coupling mechanism has a first plate and a second plate with each of the first plate and the second plate having at least one aperture therethrough;
   an alignment mechanism configured to be coupled to each of the first coupling mechanism and the second coupling mechanism, the alignment mechanism having a first section and a second section with the first section being slidably engaged to the first section,
      wherein each of the first section and the second section have a plurality of apertures therethrough, and
      wherein each of a first end and a second end of the alignment mechanism has a coupling extension with an aperture therethrough;
   at least one securement mechanism for securing a length of the alignment mechanism; and
   at least two secondary securement mechanisms configured to secure the first coupling mechanism to a first end of the alignment mechanism and to secure the second coupling mechanism to the second end of the alignment mechanism.

2. The system of claim 1 further comprising a first coupling securement mechanism configured to secure the first coupling mechanism to the automobile.

3. The system of claim 1 further comprising a second coupling securement mechanism configured to secure the second coupling mechanism to the trailer.

4. The system of claim 1 wherein the alignment mechanism is configured to be secured at varying positions thereby increasing or decreasing the length of the alignment mechanism.

5. A trailer alignment system comprising:
   a first coupling mechanism coupled to an automobile,
      wherein the first coupling mechanism has a first plate and a second plate with each plate having an aperture therethrough;
   a second coupling mechanism coupled to a trailer,
      wherein the second coupling mechanism has a first plate and a second plate with each plate having an aperture therethrough;
   an alignment mechanism having a first end and a second end with each of the first end and the second end having a coupling extension with an aperture therethrough, the alignment mechanism being coupled to each of the first coupling mechanism and the second coupling mechanism,
      wherein the alignment mechanism has a first section and a second section with the first section being slidably engaged to the first section,
      wherein the first section and second section have a plurality of apertures through at least one side surface of the alignment mechanism;
   wherein a first pin and a second pin secure the alignment mechanism with the first coupling mechanism and second coupling mechanism respectively; and
   wherein a third pin fixes a working length of the alignment mechanism.

6. The system of claim 5 wherein the aperture of the first plate of the first coupling mechanism is aligned with the aperture of the second plate of the first coupling mechanism.

7. The system of claim 5 wherein the aperture of the first plate of the second coupling mechanism is aligned with the aperture of the second plate of the second coupling mechanism.

8. The system of claim 5 wherein the third pin is configured to be inserted into at least one of the plurality the apertures formed in the first section and the second section of the alignment mechanism.

9. The system of claim 5 wherein the coupling section is perpendicular to the first section or the second section.

10. A method of aligning a towable trailer and an automobile, the method comprising the steps of:
    providing a trailer alignment apparatus comprising:
       an alignment mechanism configured to be coupled to each of the first coupling mechanism and the second coupling mechanism, the alignment mechanism having a first section and a second section with the first section being slidably engaged to the second section,
          wherein the first section and second section have a plurality of apertures therethrough, and
          wherein each of a first end and a second end of the alignment mechanism has a coupling extension with an aperture therethrough;
       at least one securement mechanism for securing a length of the alignment mechanism, and
       at least two secondary securement mechanisms configured to secure the first coupling mechanism to a first end of the alignment mechanism and to secure the second coupling mechanism to the second end of the alignment mechanism;
    engaging the first end of the alignment mechanism with a first coupling mechanism, the first coupling mechanism being secured to a portion of an automobile,
       wherein the first coupling mechanism has a first plate and a second plate with each plate having an aperture therethrough;
    securing the first end of the alignment mechanism to the first coupling mechanism;
    operating the automobile such that the second end of the alignment mechanism engages with a second coupling mechanism, the second coupling mechanism being coupled to the towable trailer; and
    securing the second end of the alignment mechanism to the second coupling mechanism,
       wherein the second coupling mechanism has a first plate and a second plate with each plate having an aperture therethrough.

11. The method of claim 10 further comprising the step of:
    securing a trailer hitch of the automobile to a trailer coupling mechanism of the towable trailer.

12. The method of claim 10 further comprising the steps of:
    determining a working length required of the alignment mechanism;

positioning the first section of the alignment mechanism respective to the second section of the alignment mechanism; and securing the length of the first section and the second section forming a working length.

13. The method of claim 12 wherein the securing step is performed by inserting the at least two secondary securement mechanisms into apertures present in the first section and the second section.

\* \* \* \* \*